E. S. CHURCH.
FASTENER.
APPLICATION FILED FEB. 25, 1918.
1,308,146.
Patented July 1, 1919.
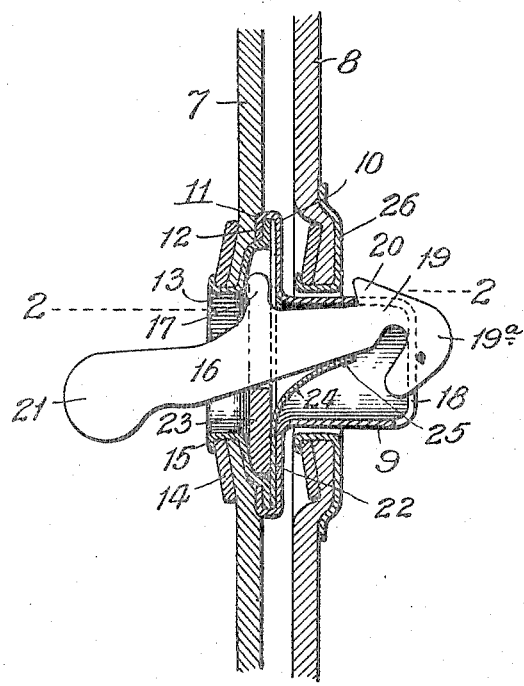
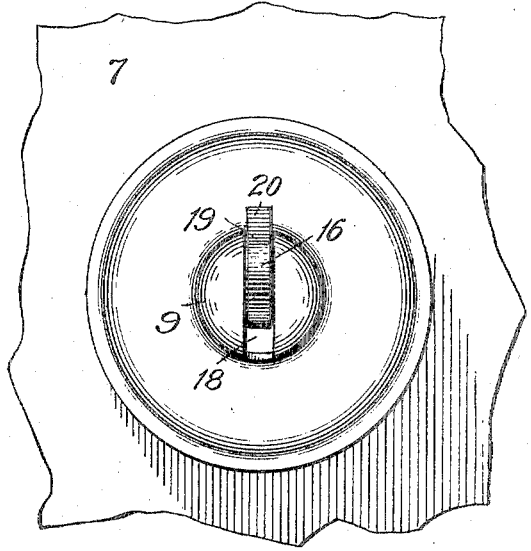
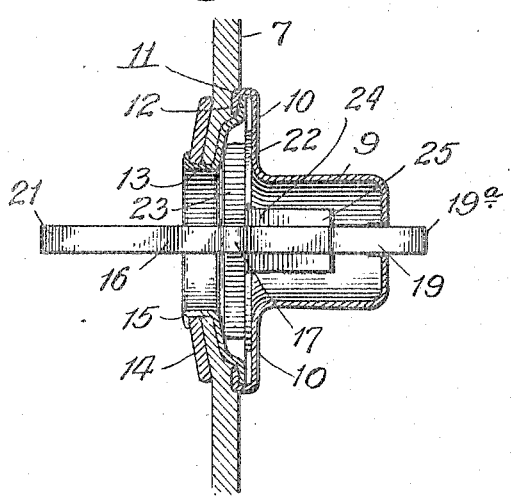
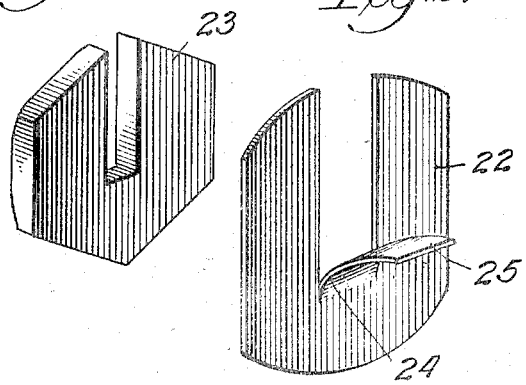
Witness:
John Enders
Inventor:
Edmund S. Church
by
Fred Gerlach
his Atty.

UNITED STATES PATENT OFFICE.

EDMUND S. CHURCH, OF CHICAGO, ILLINOIS, ASSIGNOR TO AUTOMATIC CARBURETOR COMPANY, OF CHICAGO, ILLINOIS, A CORPORATION OF ILLINOIS.

FASTENER.

1,308,146.  Specification of Letters Patent.  Patented July 1, 1919.

Application filed February 25, 1918. Serial No. 218,977.

*To all whom it may concern:*

Be it known that I, EDMUND S. CHURCH, a citizen of the United States, and a resident of Chicago, in the county of Cook and State of Illinois, have invented certain new and useful Improvements in Fasteners, of which the following is a full, clear, and exact description.

The invention relates to curtain fasteners and the like.

The object of the invention is to provide an improved fastener whereby two curtains or flexible parts may be detachably secured together and in which there is a locking member that extends through the fastener so that it is adapted to be released either from the inside or the outside.

The invention consists in the several novel features hereinafter set forth and more particularly defined by claims at the conclusion hereof.

In the drawings: Figure 1 is a section of the improved fastener. Fig. 2 is a section on line 2—2 of Fig. 1, one curtain being omitted. Fig. 3 is an outside face view of the stud member. Fig. 4 is a perspective of the filler member. Fig. 5 is a perspective of the spring member.

The invention is shown as applied for fastening curtains 7 and 8 together. The improved fastener comprises a hollow stud 9 which is formed of sheet metal and is provided at its inner end with an integral shoulder 10 and an inturned flange 11 which is lapped around the marginal flange 12 of a hollow rivet 13 which passes through the curtain 7 and serves to secure the hollow stud to the curtain. A washer 14 is interposed between the flanges inside of the curtain and an inner flange 15 of rivet 13.

A latch 16 is disposed in the hollow stud and comprises an ear or lug 17 which is held between the shoulder portion 10 of the hollow stud and the flange 12 of the rivet 13 to hold the latch against bodily longitudinal movement in the stud. This latch is rigid in itself and is extended outwardly, as at 19, through a transverse slot 18 in the outer end of the stud, to form a stop tooth or locking portion 20 which projects radially from the outer periphery of the hollow stud, and to form a projecting grip-portion 19ª and is extended inwardly, as at 21, through the hollow rivet 13 to form a handle by which the latch can be manipulated from the inside of the curtain 7. Washers 22 and 23 are secured between the shoulder portion 10 of the stud and the flange 12 of the hollow rivet 13 and both of these washers are slotted to permit the latch to pass therethrough and work therein. The latch is held against transverse movement by the sides of the slot in washer 23. Washer 22 is formed of spring metal and is provided with a bent tongue 24 which is extended, as at 25, to engage the latch. This tongue serves to hold the latch normally, in its operative position, shown in Fig. 1, and to restore it to such position, either when the latch is swung laterally from the outside or the inside. The outer end of the latch is guided in slot 18.

The curtain 8 is provided with a hollow washer or socket 26 which is adapted to receive the hollow stud and may be secured to the curtain in any suitable manner.

When it is desired to release the curtain from the outside, the portion 19ª of the latch can be pressed in such direction as to cause the stop portion 20 to move within the hollow stud to release socket 26 and when it is desired to release the curtain 8 from the inside, the inner end 21 of the latch can be moved in the opposite direction to correspondingly swing the stop 20 clear of the washer 26.

The invention thus exemplifies a curtain fastener which comprises a stud and socket and in which a latch is adapted to be manipulated either from the inside or the outside of the curtain. On automobiles, it is very desirable in some instances to manipulate the fasteners from the inside.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fastener, the combination of a stud, means whereby it may be secured to a support, a latch movably mounted in the stud and means whereby the latch may be manipulated either from the outside or the inside of the support for the stud.

2. In a fastener, the combination of a stud, means whereby it may be secured to a support, a latch movably mounted in the stud and provided with integral means whereby it may be manipulated either from the outside or the inside of the support for the stud.

3. In a fastener, the combination of a hollow stud, means whereby it may be secured to a support, a latch provided with a pivot-portion held in the stud, a slotted guide member in the stud in which the latch is held, and means whereby the latch may be manipulated either from the outside or the inside of the stud.

4. In a fastener, the combination of a hollow stud, and means whereby it may be secured to a support, a latch movably sustained in the hollow stud, provided with a stop portion on the outside of the curtain, and means extending through said stud and disposed at the inside of the curtain for manipulating said latch.

5. In a fastener, the combination of a hollow stud provided with means whereby it may be secured to a curtain, a latch movably sustained in the hollow stud, spring means for holding the latch in operative position, said latch being provided with a stop and grip portions on the outside of the curtain, and means disposed at the inside of the curtain to which the stud is secured for manipulating said stop portion.

6. In a curtain fastener, the combination of a hollow stud provided with means whereby it may be secured to a curtain or support, a latch movably sustained in the hollow stud, spring means for holding the latch in operative position, said latch being provided with a pivot-portion, a slotted washer in which said pivot portion is held, and means disposed at the inside of the curtain for manipulating said stop portion.

EDMUND S. CHURCH.